(12) United States Patent
Park et al.

(10) Patent No.: US 11,540,360 B2
(45) Date of Patent: Dec. 27, 2022

(54) INDUCTION HEATING DEVICE AND METHOD FOR CONTROLLING INDUCTION HEATING DEVICE

(71) Applicant: LG ELECTRONICS INC., Seoul (KR)

(72) Inventors: Wongyu Park, Seoul (KR); Gwangrok Kim, Seoul (KR); Bada Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 531 days.

(21) Appl. No.: 16/556,504

(22) Filed: Aug. 30, 2019

(65) Prior Publication Data
US 2020/0077471 A1 Mar. 5, 2020

(30) Foreign Application Priority Data
Aug. 30, 2018 (KR) .................. 10-2018-0103042

(51) Int. Cl.
*H05B 6/06* (2006.01)
*H05B 6/12* (2006.01)
(Continued)

(52) U.S. Cl.
CPC ............... *H05B 6/065* (2013.01); *H05B 6/08* (2013.01); *H05B 6/1245* (2013.01); *H05B 6/1272* (2013.01); *H05B 6/44* (2013.01)

(58) Field of Classification Search
CPC ............ C12Q 1/6837; C12Q 1/6883; C12Q 2600/106; C12Q 2600/154; H05B 6/065; H05B 6/08; H05B 6/1245; H05B 6/1272; H05B 6/44

USPC ....... 219/620, 621, 622, 623, 624, 625, 626, 219/627, 660, 661, 662, 663, 664, 665, 219/666, 667, 670, 672, 673, 674, 675, 219/676, 600, 445.1; 363/21, 97

See application file for complete search history.

(56) References Cited

U.S. PATENT DOCUMENTS 9,277,598 B2 * 3/2016 Lee ...................... H05B 6/1272
2007/0135037 A1 6/2007 Barragan Perez et al.
(Continued)

FOREIGN PATENT DOCUMENTS

CN 106247416 12/2016
EP 2 506 663 10/2012
(Continued)

OTHER PUBLICATIONS

European Office Action dated Oct. 13, 2020.
(Continued)

*Primary Examiner* — Quang T Van
(74) *Attorney, Agent, or Firm* — Ked & Associates LLP

(57) ABSTRACT

An induction heater device and a method for controlling an induction heating device are provided. The method may include determining a first target frequency of a first working coil corresponding to the drive command for the first working coil, determining a second target frequency of a second working coil corresponding to the drive command for the second working coil, and determining a final drive frequency of the first working coil and a final drive frequency of the second working coil based on the first target frequency and the second target frequency, respectively.

18 Claims, 8 Drawing Sheets

(51) Int. Cl.
　　*H05B 6/64*　　(2006.01)
　　*H05B 6/44*　　(2006.01)
　　*H05B 6/08*　　(2006.01)

(56) References Cited

U.S. PATENT DOCUMENTS

| | | |
|---|---|---|
| 2010/0237065 A1 | 9/2010 | Cho et al. |
| 2012/0248098 A1 | 10/2012 | Lee et al. |
| 2016/0150597 A1* | 5/2016 | Yun ............... H05B 6/1272 219/662 |
| 2018/0166199 A1 | 6/2018 | Hachiya et al. |

FOREIGN PATENT DOCUMENTS

| | | |
|---|---|---|
| EP | 2 506 668 | 10/2012 |
| JP | 2012-084509 | 4/2012 |
| JP | 2013-191519 | 9/2013 |
| JP | 2017/168236 | 9/2017 |
| KR | 10-2012-0109965 | 10/2012 |
| KR | 10-1735754 | 5/2017 |
| KR | 10-2017-0075913 | 7/2017 |

OTHER PUBLICATIONS

International Search Report dated Dec. 17, 2019.
European Search Report dated Jan. 28, 2020.
U.S. Appl. No. 16/556,504, filed Aug. 30, 2019.
U.S. Appl. No. 17/271,112, filed Feb. 24, 2021.
U.S. Appl. No. 17/271,159, filed Feb. 24, 2021.
Chinese Office Action dated Sep. 22, 2022 issued in CN Application No. 201980056698.X.

* cited by examiner

PRIOR ART

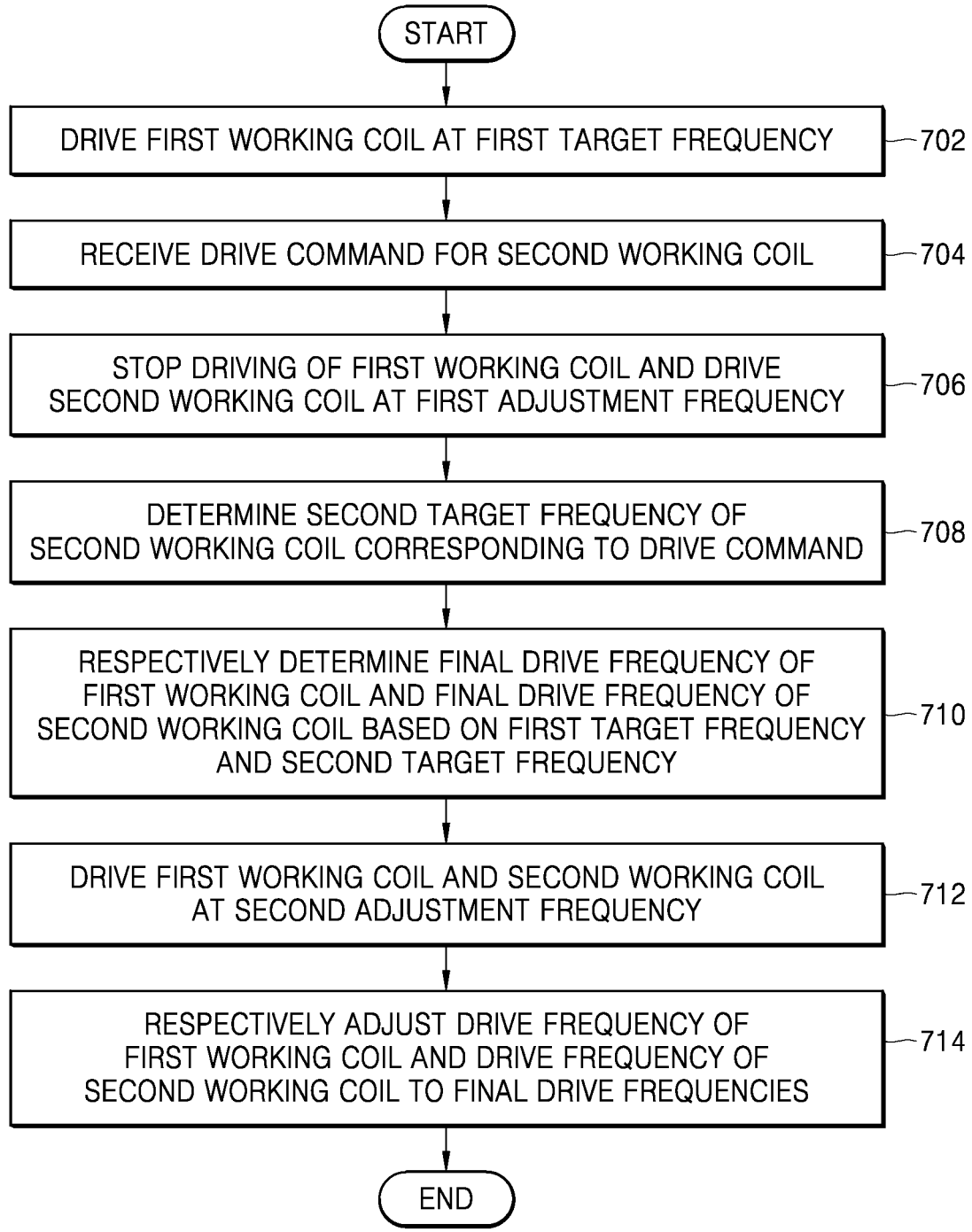

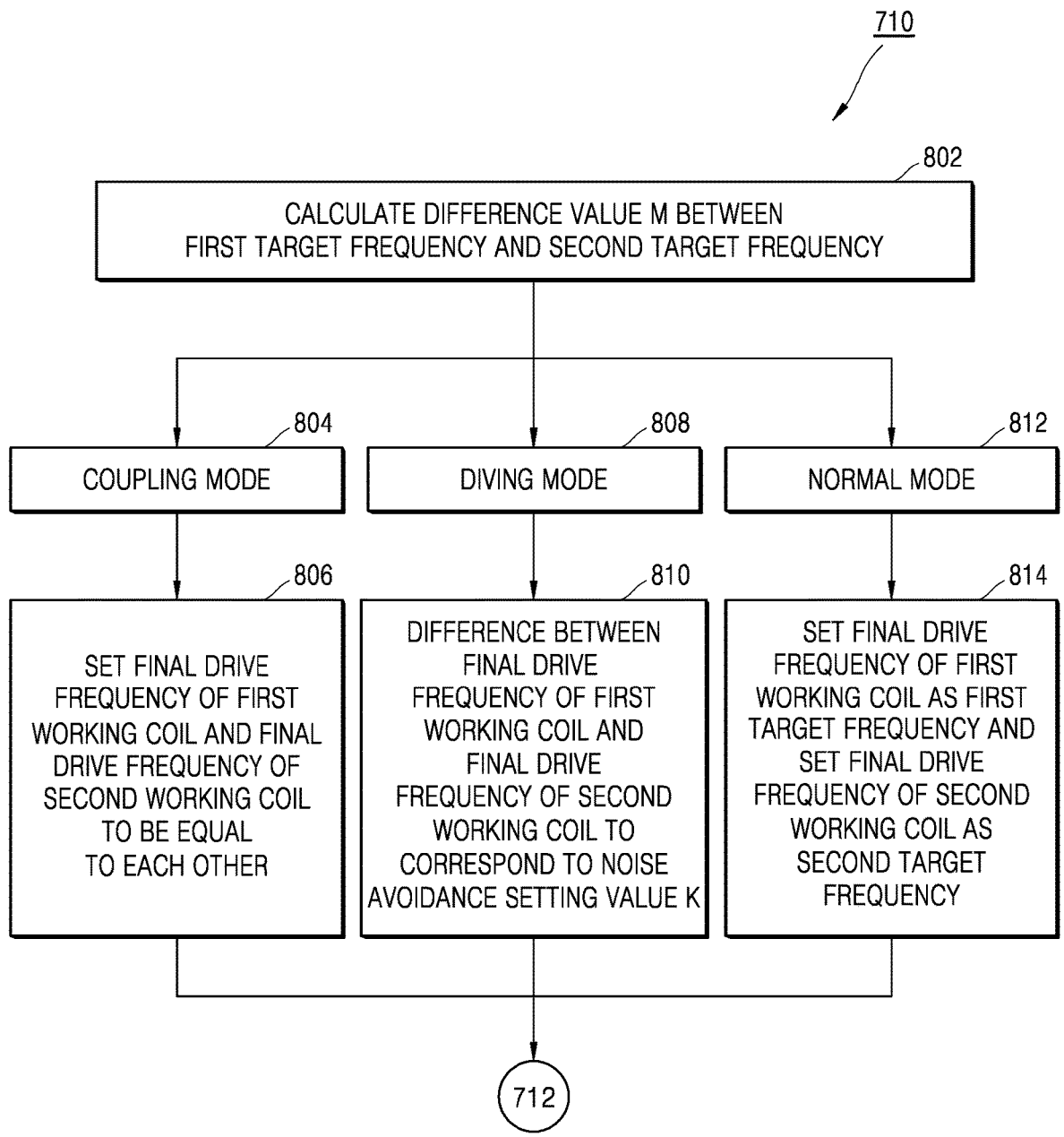

INDUCTION HEATING DEVICE AND METHOD FOR CONTROLLING INDUCTION HEATING DEVICE

CROSS-REFERENCE TO RELATED APPLICATION(S)

This application claims priority under 35 U.S.C. § 119 to Korean Application No. 10-2018-0103042, filed in Korea on Aug. 30, 2018, whose entire disclosure is herein incorporated by reference.

BACKGROUND

Field

An induction heating device and a method for controlling an inducting heating device are disclosed herein.

Background

Various types of cooking utensils are being used to heat food in homes or restaurants. Conventionally, gas ranges using gas as a fuel have come into wide use. However, recently, devices for heating a container, for example, a cooking container, such as a cooking pot, using electricity without using gas have come into use.

Methods of heating a container using electricity are divided into resistance heating methods and induction heating methods. The resistance heating method is a method of heating a container by transferring heat generated when a current is passed through a metal-resistant wire or a non-metallic heating element, such as silicon carbide, to the container via radiation or conduction. The induction heating method is a method of generating an eddy current in a container that is made of a metal component using a magnetic field that occurs around a working coil when a predetermined magnitude of high-frequency power is applied to the working coil so that the container itself is heated.

A principle of the induction heating method will be described in more detail hereinafter. First, as power is applied to the induction heating device, a predetermined magnitude of high-frequency voltage is applied to the working coil. Accordingly, an induction magnetic field occurs around the working coil disposed in the induction heating device. When a magnetic line of force of the induction magnetic field passes through the bottom of the container including a metal component that is placed on the induction heating device, an eddy current occurs in the bottom of the container. When the eddy current flows through the bottom of the container, the container itself is heated.

An induction heating device currently being used includes two or more heating areas and two or more working coils corresponding to the heating areas. For example, when a user who uses an induction heating device having two heating areas wishes to respectively place containers on the two heating areas and perform cooking using the containers simultaneously, power for driving is supplied to each of the two working coils. As power is supplied to each working coil, each working coil generates a resonant frequency.

In this case, when an absolute value of a difference value between resonant frequencies of respective working coils is included in an audible frequency band (2 k to 15 kHz), interference noise caused is generated by driving of the working coils. The interference noise generated as described above causes great inconvenience to the user who uses the induction heating device, and may cause the user to suspect a failure of the induction heating device.

As such, various methods have been proposed to reduce interference noise of an induction heating device having two or more working coils. One of the methods to reduce the interference noise is to adjust an output of each heating area or adjust an operating frequency of each working coil by controlling an operation of a power module for supplying power to a working coil. For example, Korean Patent Registration No. 10-1735754, which is hereby incorporated by reference, discloses that, in an induction heating device having a plurality of working coils, a switching element connected to each induction coil is sequentially turned on/off in a time division manner, and thereby interference noise is prevented even when the plurality of working coils are driven simultaneously.

FIG. 1 is a graph illustrating a frequency control method for reducing interference noise of an induction heating device according to the related art. FIG. 1 illustrates a driving process of an induction heating device having two working coils. In FIG. 1, f1 represents a drive frequency of a first working coil, and f2 represents a drive frequency of a second working coil. Also, t represents time.

When a user issues a drive command for a first working coil via an interface unit of the induction heating device, the first working coil may operate at a drive frequency corresponding to the drive command issued by the user (for example, 30 kHz) so as to provide an output corresponding to the drive command issued by the user.

When the first working coil is driven at a drive frequency of 30 kHz, the user may issue a drive command for a second working coil. When the drive command for the second working coil is input, the second working coil may start to be driven at a preset frequency (for example, 70 kHz) at a time point T1. As such, when the second working coil starts to be driven, the first working coil may be continuously driven at the existing drive frequency (30 kHz).

Subsequently, the induction heating device may adjust a drive frequency of the second working coil until the drive frequency of the second working coil reaches a frequency for allowing the second working coil to supply an output corresponding to the drive command for the second working coil, that is, a target frequency (for example, 30 kHz). When the drive frequency of the second working coil reaches the target frequency at a time point T2, the second working coil may be driven at 30 kHz after the time point T2.

According to the above-described process, both the first working coil and the second working coil may maintain a drive state thereof from the time point T1 to the time point T2 after the drive command for the second working coil is input. In this period (T1 to T2), a difference value between the drive frequency of the first working coil and the drive frequency of the second working coil may be included in an audible frequency band (2 k to 15 kHz). As a result, interference noise is generated from the time point T1 to the time point T2 by driving of the second working coil.

In addition, even when a difference between the target frequency of the second working coil determined by the process illustrated in FIG. 1 and the drive frequency of the existing first drive coil that is being driven is included in the audible frequency band (2 k to 15 kHZ), there is a problem in that interference noise occurs. For example, in FIG. 1, when the target frequency of the second working coil is determined to be 37 kHz instead of 30 kHz in a state where the target frequency of the first working coil is 30 kHz, interference noise caused by simultaneous driving of the first working coil and the second working coil occurs.

SUMMARY OF THE INVENTION

An aspect of the present disclosure is to provide an induction heating device capable of reducing an interference noise that may occur when two or more working coils perform a heating operation, and a method for controlling the induction heating device.

An aspect of the present disclosure is to provide an induction heating device capable of reducing an interference noise that may occur in the process of driving a working coil at a determined target frequency after the target frequency of the working coil is determined.

The technical aspects of the present disclosure are not limited to the above-mentioned aspects, and the other aspects and the advantages of the present disclosure which are not mentioned can be understood by the following description, and more clearly understood by embodiments of the pre-sent disclosure. It will be also readily seen that the aspects and the advantages of the present disclosure may be realized by means indicated in the patent claims and a combination thereof.

According to an embodiment, there is provided a method for controlling an induction heating device comprising: determining a first target frequency of a first working coil corresponding to the drive command for the first working coil, determining a second target frequency of a second working coil corresponding to the driving command for a second working coil, and determining a final driving frequency of the first working coil and a final driving frequency of the second working coil based on the first target frequency and the second target frequency, respectively.

In an embodiment, the method further comprises: receiving a drive command for the second working coil when the first working coil is being driven at the first target frequency, and stopping driving of the first working coil, and driving the second working coil at a predetermined first adjustment frequency.

In an embodiment, the determining the final driving frequency of the first working coil and the final driving frequency of the second working coil based on the first target frequency and the second target frequency may include calculating a difference value between the first target frequency and the second target frequency, and determining the final driving frequency of the first working coil and the final driving frequency of the second working coil according to a comparison result between the difference value and a preset reference value.

Further, in an embodiment, when the difference value is less than a first reference value, the final driving frequency of the first working coil and the final driving frequency of the second working coil may be set to be equal to each other.

Further, in an embodiment, when the difference value is less than the first reference value, the final driving frequency of the first working coil and the final driving frequency of the second working coil may be set as any one among the first target frequency and the second target frequency.

Further, in an embodiment, when the difference value is equal to or greater than the first reference value and less than the second reference value, a difference be-tween the final driving frequency of the first working coil and the final driving frequency of the second working coil may be set to correspond to a preset noise avoidance setting value.

Further, in an embodiment, when the difference value is equal to or greater than the first reference value and less than the second reference value, a value obtained by increasing a larger value among the first target frequency and the second target frequency by the preset noise avoidance setting value and a smaller value among the first target frequency and the second target frequency may be set as the final driving frequency of the first working coil and the final driving frequency of the second working coil, respectively.

Further, in an embodiment, when the difference value is equal to or greater than a second reference value, the final driving frequency of the first working coil may be set as the first target frequency, and the final driving frequency of the second working coil may be set as the second target frequency.

Further, in an embodiment, the method further comprises: driving the first working coil and the second working coil simultaneously at a second adjustment frequency, and adjusting a drive frequency of the first working coil and a drive frequency of the second working coil to the final drive frequency of the first working coil and the final drive frequency of the second working coil, respectively.

According to another embodiment, there is provided an induction heating device. The induction heating device may include a first working coil disposed to correspond to a first heating area, a second working coil disposed to correspond to a second heating area, and a control unit configured to adjust driving frequencies of the first working coil and/or the second working coil according to a driving command inputted by a user. The control unit may determine a first target frequency of the first working coil corresponding to the drive command for the first working coil, determine a second target frequency of a second working coil corresponding to the driving command for the second working coil, and determine a final driving frequency of the first working coil and a final driving frequency of the second working coil based on the first target frequency and the second target frequency, respectively.

In an embodiment, the control unit may calculate a difference value between the first target frequency and the second target frequency, and determine the final drive frequency of the first working coil and the final drive frequency of the second working coil according to a comparison result between the difference value and a predetermined reference value.

Further, in another embodiment, the control unit may calculate a difference value between the first target frequency and the second target frequency, and determine the final driving frequency of the first working coil and the final driving frequency of the second working coil according to a comparison result between the difference value and a preset reference value.

Further, in another embodiment, when the difference value is less than a first reference value, the final driving frequency of the first working coil and the final driving frequency of the second working coil may be set to be equal to each other.

Further, in another embodiment, when the difference value is less than a first reference value, the final driving frequency of the first working coil and the final driving frequency of the second working coil may be set as any one among the first target frequency and the second target frequency.

Further, in another embodiment, when the difference value is equal to or greater than the first reference value and less than the second reference value, a difference between the final driving frequency of the first working coil and the final driving frequency of the second working coil may be set to correspond to a preset noise avoidance setting value.

Further, in another embodiment, when the difference value is equal to or greater than the first reference value and less than the second reference value, a value obtained by increasing a larger value among the first target frequency and the second target frequency by a preset noise avoidance setting value, and a smaller value among the first target frequency and the second target frequency may be set as the final driving frequency of the first working coil and the final driving frequency, respectively.

Further, in another embodiment, when the difference value is equal to or greater than a second reference value, the final driving frequency of the first working coil may be set as the first target frequency, and the final driving frequency of the second working coil may be set as the second target frequency.

Further, in another embodiment, the control unit may drive the first working coil and the second working coil simultaneously at a second adjustment frequency, and adjust a drive frequency of the first working coil and a drive frequency of the second working coil to the final drive frequency of the first working coil and the final drive frequency of the second working coil, respectively.

According to embodiments of the present disclosure, there is an advantage in that it is possible to reduce an interference noise that may occur when two or more working coils provided in the induction heating device perform a heating operation.

Further, according to embodiments of the present disclosure, there is an advantage in that it is possible to reduce an interference noise that may occur in the process of driving a working coil at a determined target frequency after the target frequency of the working coil is determined.

BRIEF DESCRIPTION OF THE DRAWINGS

Embodiments will be described in detail with reference to the following drawings in which like reference numerals refer to like elements, and wherein:

FIG. 7 is a flowchart illustrating a method for controlling an induction heating device according to an embodiment; and FIG. 8 is a flowchart illustrating a method for obtaining final drive frequencies of a first working coil and a second working coil according to an embodiment.

DETAILED DESCRIPTION

Figure 1:
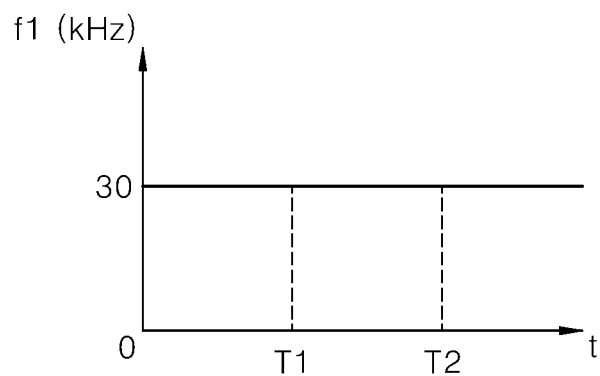
FIG. 1 is a graph illustrating a frequency control method for reducing interference noise of an induction heating device according to the related art.
Figure 1:
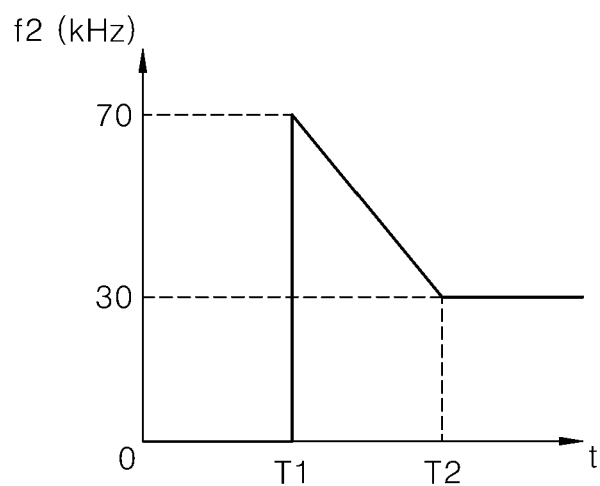

Aspects, features and advantages will be described with reference to the accompanying drawings, such that those skilled in the art can easily carry out a technical idea. In the description of the embodiments, the detailed description of well-known related configurations or functions will be omitted when it is deemed that such description will cause ambiguous interpretation. Hereinafter, embodiments will be described with reference to the accompanying drawings. In the drawings, same reference numerals designate same or like elements.

Figure 2:
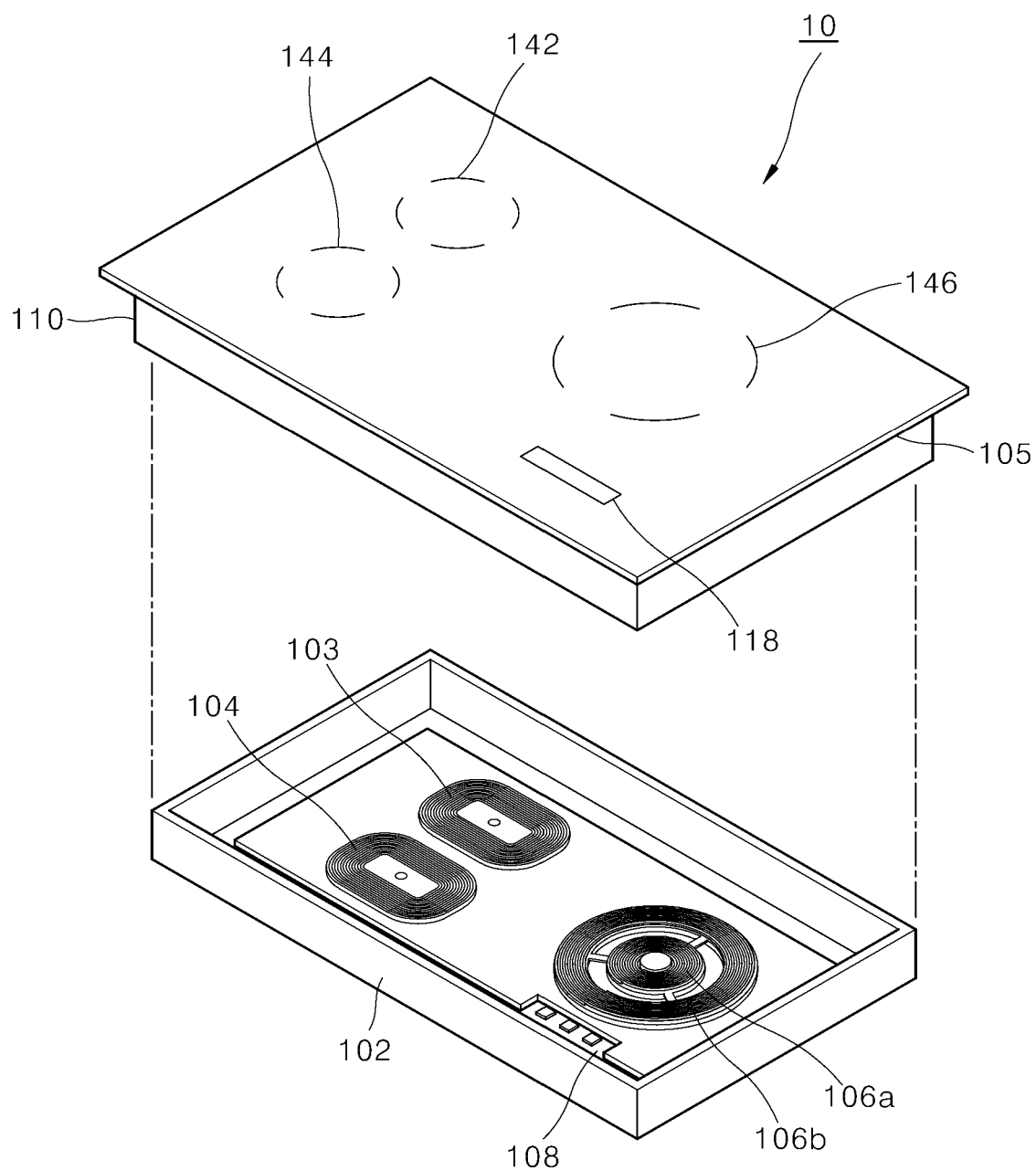
FIG. 2 is a perspective view illustrating an induction heating device according to an embodiment.

FIG. 2 is a perspective view illustrating an induction heating device according to an embodiment. Referring to FIG. 2, an induction heating device 10 according to an embodiment may include a case 102 constituting a main body, and a cover plate 110 coupled to the case 102 to seal the case 102.

A lower surface of the cover plate 110 may be coupled to an upper surface of the case 102 to seal a space formed inside of the case 102 from the outside. An upper surface of the cover plate 110 may be provided with an upper plate portion or plate 105 on which a container for cooking food may be placed. The upper plate portion 105 may be made of various materials, for example, a tempered glass material, such as ceramic glass.

Working coils 103, 104, and 106a and 106b for heating a container may be disposed in an inner space of the case 102 formed by coupling of the cover plate 110 and the case 102. More specifically, a first working coil 103, a second working coil 104, and third working coils 106a and 106b may be disposed inside of the case 102.

In FIG. 1, the first working coil 103 and the second working coil 104 each may have a rectangular shape with curved corners, and the third working coils 106a and 106b may have a circular shape; however, embodiments are not limited thereto and a shape of each working coil may vary depending on the embodiment. In addition, the number and arrangement of working coils provided in the induction heating device 10 may vary depending on the embodiment.

In an embodiment, the third working coils 106a and 106b may be composed of two coils, that is, an inner coil 106a and an outer coil 106b. FIG. 1 illustrates an embodiment in which two coils constitute the third working coil, but the number of coils constituting the third working coil and the number of coils constituting the inner coil and the outer coil may vary depending on the embodiment.

For example, the third working coil may be composed of four coils. For example, two coils disposed inside of the third working coil may be defined as an inner coil, and the other two coils disposed outside may be defined as an outer coil. In another example, three coils disposed inside of the third working coil may be defined as an inner coil, and the other one coil disposed outside may be defined as an outer coil.

When a user places a container on the cover plate 110, a first heating area 142, a second heating area 144, and a third heating area 146 may be displayed on a surface of the upper plate portion 105 of the cover plate 110 at positions respectively corresponding to positions of the first working coil 103, the second working coil 104, and the third working coils 106a and 106b such that the user matches a position of the container with a position of the first working coil 103, the second working coil 104, or the third working coils 106a and 106b.

Further, the inner space of the case 102 may be provided with an interface unit 108 having a function of allowing a user to apply power, adjusting outputs of the working coils 103, 104, and 106a and 106b, or displaying information related to the induction heating device 10. Hereinafter, embodiments will be described with reference to an embodiment in which the interface unit 108 is implemented as a touch panel capable of both inputting information by means of touch and displaying information; however, embodiments are not limited thereto and the interface unit 108 may be implemented as a different form or structure depending on the embodiment.

Further, the upper plate portion 105 of the cover plate 110 may be provided with a manipulation area 118 at a position corresponding to a position of the interface unit 108. In the manipulation area 118, a specific character or image for a user's manipulation or for displaying information may be displayed. The user may perform a desired operation by manipulating (for example, touching) a specific point of the manipulation area 118 with reference to the character or image displayed on the manipulation area 118. In addition, various types of information output by the interface unit 108 may be displayed via the manipulation area 118 according to the user's manipulation or an operation of the induction heating device 10.

Further, a power module (not illustrated) for supplying power to the working coils 103, 104, and 106a and 106b or the interface unit 108 may be disposed in the inner space of the case 102. The power module may be electrically connected to the working coils 103, 104, and 106a and 106b or the interface unit 108, and may convert power applied from an external power source into power suitable for driving of the working coils 103, 104, and 106a and 106b or the interface unit 108, and supply the converted power to the working coils 103, 104, and 106a and 106b or the interface unit 108.

For reference, FIG. 1 illustrates an embodiment in which three working coils 103, 104, and 106a and 106b are disposed in the inner space of the case 102. In some embodiments, one working coil or four working coils may be disposed in the inner space of the case 102.

Although not illustrated in FIG. 1, a control unit (not illustrated) may be disposed in the inner space of the case 102. The control unit (not illustrated) may control power supply to the working coils 103, 104, and 106a and 106b based on driving of the power module according to a user's command (heating command, heating end command, or thermal power control command, for example) input via the interface unit 108.

The user may place the container on a desired heating area among the first heating area 142, the second heating area 144, and the third heating area 146, and then may issue a heating command with a thermal power setting for the heating area on which the container is placed. The user's heating command input via the manipulation area 118 may be input to the control unit (not illustrated) as a drive command for a working coil corresponding to the heating area on which the user places the container. The control unit (not illustrated) receiving the drive command may drive the working coil, which is a target of the drive command, to perform a heating operation on the container.

Figure 3:
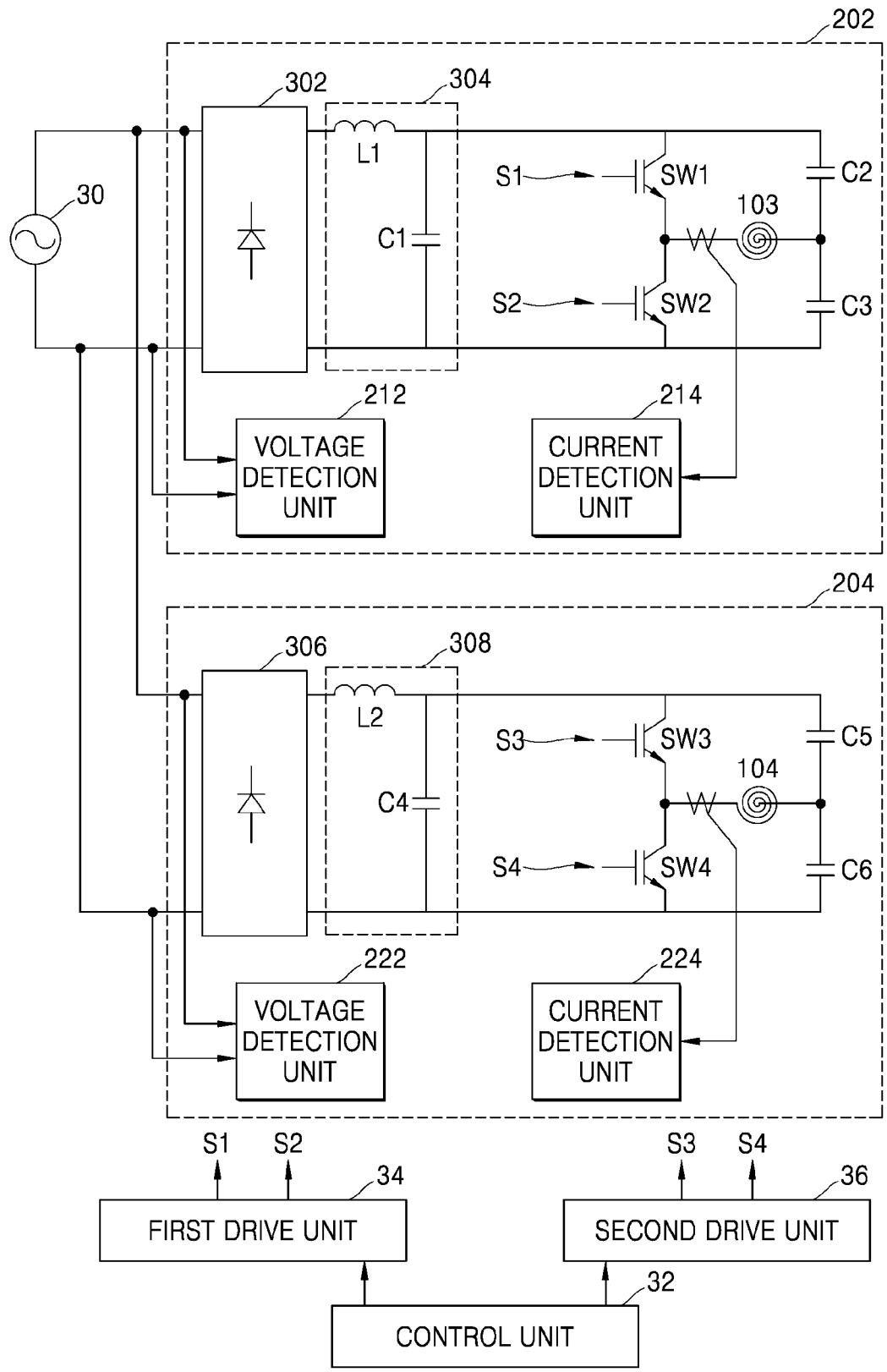
FIG. 3 is a circuit diagram illustrating a working coil and a power module of an induction heating device according to an embodiment.

FIG. 3 is a circuit diagram illustrating a working coil and a power module of an induction heating device according to an embodiment. For reference, FIG. 3 is a circuit diagram illustrating a case where an induction heating device according to an embodiment includes two working coils, that is, a first working coil 103 and a second working coil 104. However, as described above, the induction heating device according to an embodiment may have two or more working coils, and a method for controlling the induction heating device described below may be applied to an induction heating device having two or more working coils in the same manner.

Referring to FIG. 3, the induction heating device according to an embodiment may include two power modules, that is, a first power module 202 and a second power module 204. The first power module 202 and the second power module 204 may convert alternating current (AC) power supplied from an external power source 30 to supply power for driving each of the first working coil 103 and the second working coil 104.

The first power module 202 may include a rectification unit 302 and a smoothing unit 304. The rectification unit 302 may rectify and output AC power supplied from the external power source 30. The smoothing unit 304 may include a first inductor L1 and a first capacitor C1, and may convert the power output from the rectification unit 302 into direct current (DC) power to output the DC power.

The second power module 204 also may include a rectification unit 306 and a smoothing unit 308. The rectification unit 306 may rectify and output AC power supplied from the external power source 30. The smoothing unit 308 may include a second inductor L2 and a fourth capacitor C4, and may convert the power output from the rectification unit 306 into DC power to output the DC power.

Further, the first power module 202 may include a plurality of switching elements SW1 and SW2 and a plurality of capacitors C2 and C3. First switching element SW1 and second switching element SW2 may be connected in series with each other, and may repeatedly perform turn-on and turn-off operations by means of a first switching signal S1 and a second switching signal S2 output from a first drive unit 34. In embodiments, the turn-on and turn-off operations of the switching elements are referred to as "switching operation".

A second capacitor C2 and a third capacitor C3 may be connected in series with each other. The first switching element SW1, the second switching element SW2, the second capacitor C2, and the third capacitor C3 may be connected in parallel to each other.

The first working coil 103 may be connected between a connection point between the first switching element SW1 and the second switching element SW2 and a connection point between the second capacitor C2 and the third capacitor C3. When the first switching element SW1 and the second switching element SW2 perform a switching operation due to the first switching signal S1 and the second switching signal S2, respectively, applied to the first switching element SW1 and the second switching element SW2, AC power may be supplied to the first working coil 103 to perform induction heating.

The second power module 204 also may include a plurality of switching elements SW3 and SW4 and a plurality of capacitors C5 and C6. The third switching element SW3 and the fourth switching element SW4 may be connected in series with each other, and may repeatedly perform turn-on and turn-off operations, that is, a switching operation by means of a third switching signal S3 and a fourth switching signal S4 output from a second drive unit 36.

A fifth capacitor C5 and a sixth capacitor C6 may be connected in series with each other. The third switching element SW3, the fourth switching element SW4, the fifth capacitor C5, and the sixth capacitor C6 may be connected in parallel to each other.

The second working coil 104 may be connected between a connection point between the third switching element SW3 and the fourth switching element SW4 and a connection point between the fifth capacitor C5 and the sixth capacitor C6. When the third switching element SW3 and the fourth switching element SW4 perform a switching operation due to the third switching signal S3 and the fourth switching signal S4, respectively, applied to the third switching element SW3 and the fourth switching element SW4, AC power may be supplied to the second working coil 104 to perform induction heating.

The first drive unit 34 may apply the first switching signal S1 and the second switching signal S2 to the first switching element SW1 and the second switching element SW2 included in the first power module 202, respectively. In addition, the second drive unit 36 may apply the third switching signal S3 and the fourth switching signal S4 to the third switching element SW3 and the fourth switching element SW4 included in the second power module 204, respectively.

A control unit 32 may apply a control signal to each of the first drive unit 34 and the second drive unit 36 to control outputs of the switching signals S1 and S2 applied by the first drive unit 34 and outputs of the switching signals S3 and S4 applied by the second drive unit 36. The control unit 32 may adjust switching frequencies of the first switching signal S1 and the second switching signal S2 applied by the first drive unit 34, and switching frequencies of the third switching signal S3 and the fourth switching signal S4 applied by the second drive unit 36 to respectively adjust a drive frequency of the first working coil 103 and a drive frequency of the second working coil 104. An amount of power supplied to the first working coil 103 or the second working coil 104 may vary depending on the drive frequency adjusted by the control unit 32. Accordingly, the drive frequency of the first working coil 103 or the second working coil 104 and an output amount of the first working coil 103 or the second working coil 104 may vary.

Voltage detection units or detectors 212 and 222 may measure a magnitude of a voltage input to the first power module 202, that is, a magnitude of an input voltage. In addition, current detection units or detectors 214 and 224 may measure a magnitude of a current input to the first and second working coils 103 and 104, that is, a magnitude of an input current.

The control unit 32 may receive the magnitude of the input voltage from the voltage detection units 212 and 222, and may receive the magnitude of the input current from the current detection units 214 and 224. The control unit 32 may calculate an output amount of the first working coil 103 and the second working coil 104, that is, an amount of power supplied by the first working coil 103 and the second working coil 104 using the magnitudes of the received input voltage and the input current. In embodiments, a method in which the control unit 32 calculates an amount of power of each working coil using the magnitudes of the input voltage and the input current is the same as a conventional method, and accordingly, detailed description thereof has been omitted.

As described above, a user may place a container on a desired heating area, and then may issue a heating command with a thermal power setting for the heating area on which the container is placed via the manipulation area 118. The user's heating command input via the manipulation area 118 may be input to the control unit 32 as a drive command for a working coil corresponding to the heating area on which the user places the container. The control unit 32 receiving the drive command may drive the working coil, which is a target of the drive command, to perform a heating operation on the container.

When only one working coil is driven, an interference noise phenomenon described above may not occur. However, when a user issues a drive command to another working coil while one working coil is being driven, the interference noise phenomenon described above may occur according to a magnitude of a drive frequency of each working coil.

The control unit 32 of the induction heating device according to embodiments may determine a target frequency of each working coil when a user inputs a drive command for another working coil while one working coil is being driven, and may perform frequency control so as to reduce interference noise based on the determined target frequency of each working coil. The target frequency of each working coil means a drive frequency corresponding to a drive command issued with respect to each working coil. In other words, the target frequency means a drive frequency of each working coil for allowing each working coil to supplying thermal power or an output desired by the user via the drive command.

For example, when the control unit 32 of the induction heating device according to embodiments is requested to drive the second working coil 104 in a state where the first working coil 103 is being driven at a first target frequency, the control unit 32 may determine a second target frequency of the second working coil 104. The control unit 32 may determine a drive mode (coupling mode, dividing mode, or normal mode, for example) for reducing noise of the induction heating device based on the determined second target frequency and the first target frequency.

The control unit 32 may determine a final drive frequency for reducing interference noise of the first working coil 103 and the second working coil 104 based on the drive mode determined as described above. The control unit 32 may drive each working coil based on the determined final drive frequency, thereby reducing interference noise generated when the two working coils are driven simultaneously.

Hereinafter, a frequency control method for reducing interference noise of an induction heating device according to embodiments will be described with reference to the accompanying drawings. For reference, in FIG. 4 to FIG. 6, f1 represents a drive frequency of the first working coil 103, and f2 represents a drive frequency of the second working coil 104. In addition, T represents time.

Figure 4:
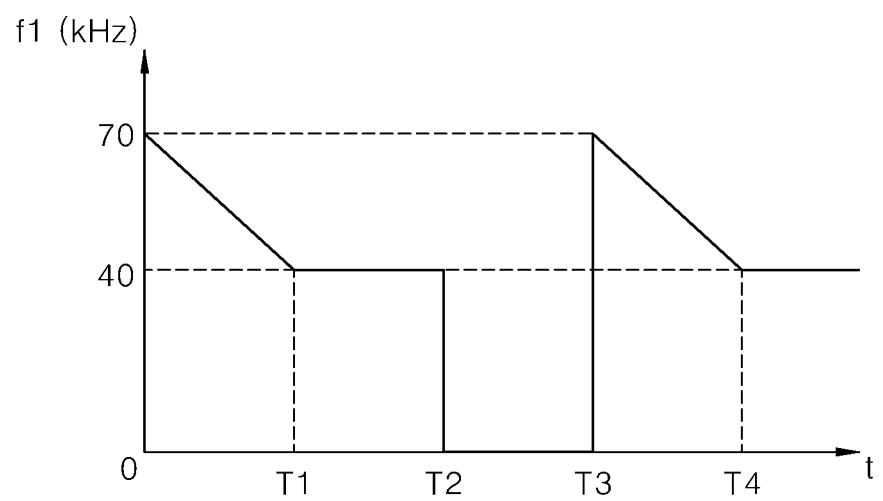
FIG. 4 is a graph illustrating a process of controlling drive frequencies of a first working coil and a second working coil when an induction heating device according to an embodiment is driven in a coupling mode.
Figure 4:
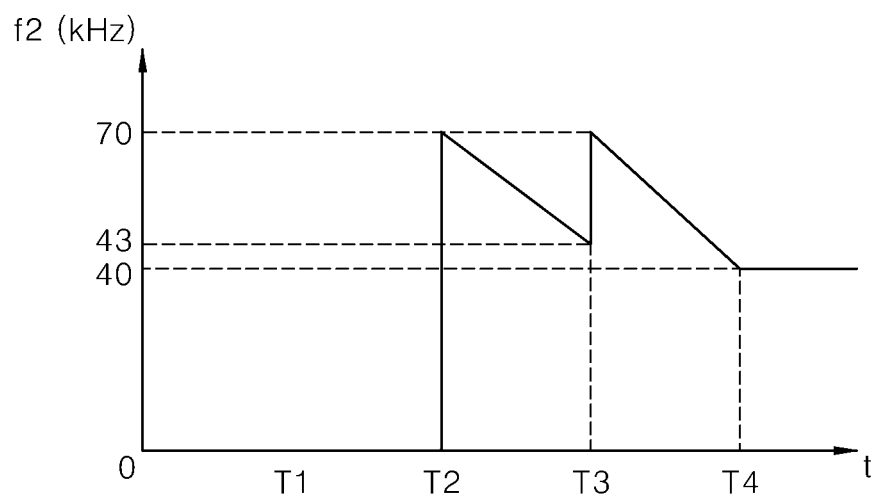
Figure 5:
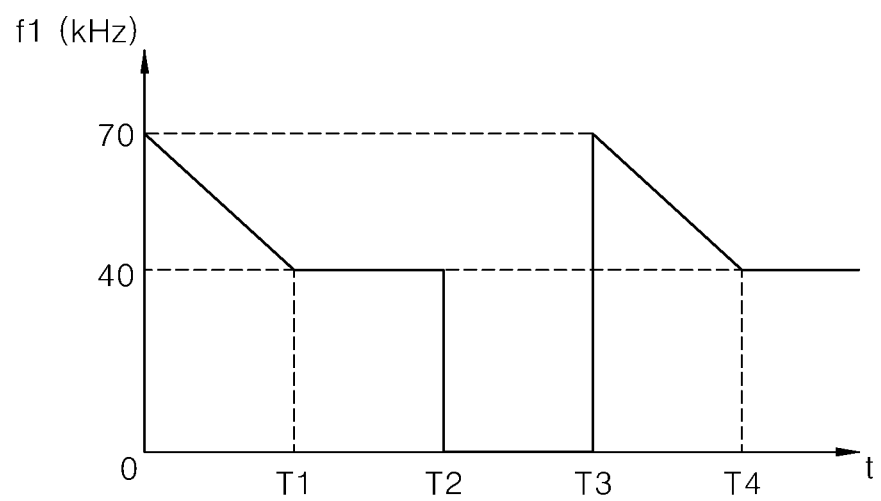
FIG. 5 is a graph illustrating a process of controlling drive frequencies of a first working coil and a second working coil when an induction heating device according to an embodiment is driven in a dividing mode.
Figure 5:
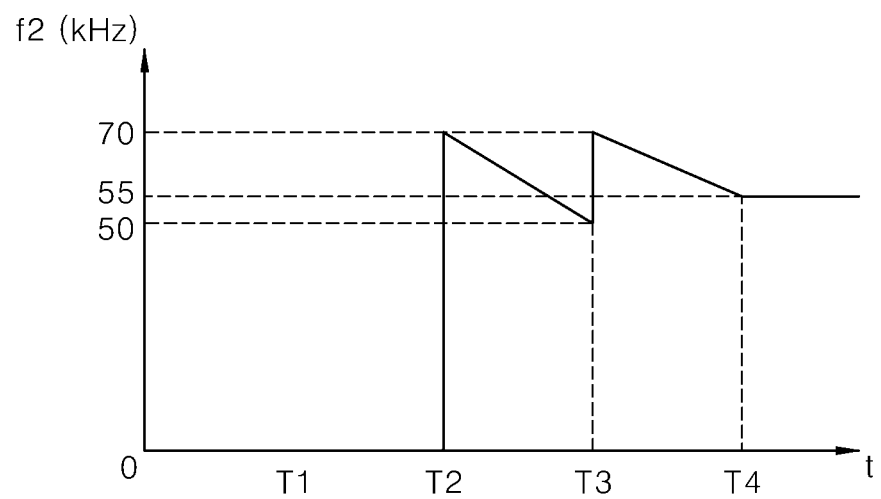
Figure 6:
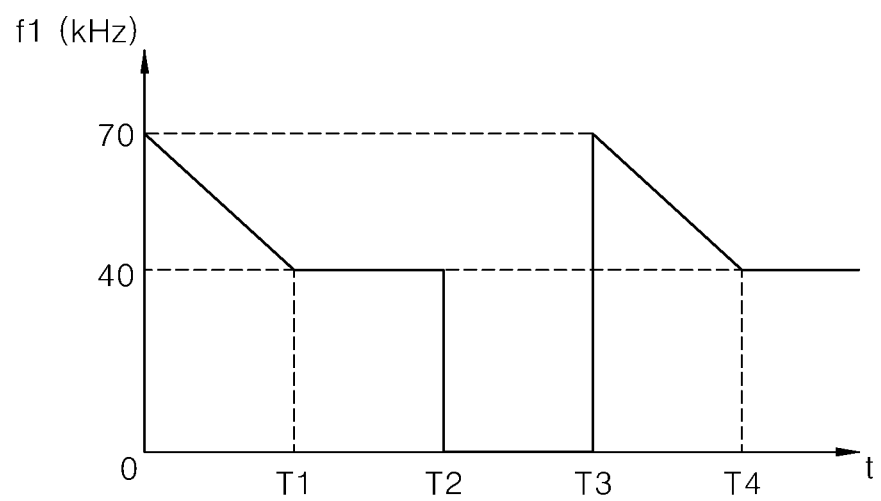
FIG. 6 is graph illustrating a process of controlling drive frequencies of a first working coil and a second working coil when an induction heating device according to an embodiment is driven in a normal mode.
Figure 6:
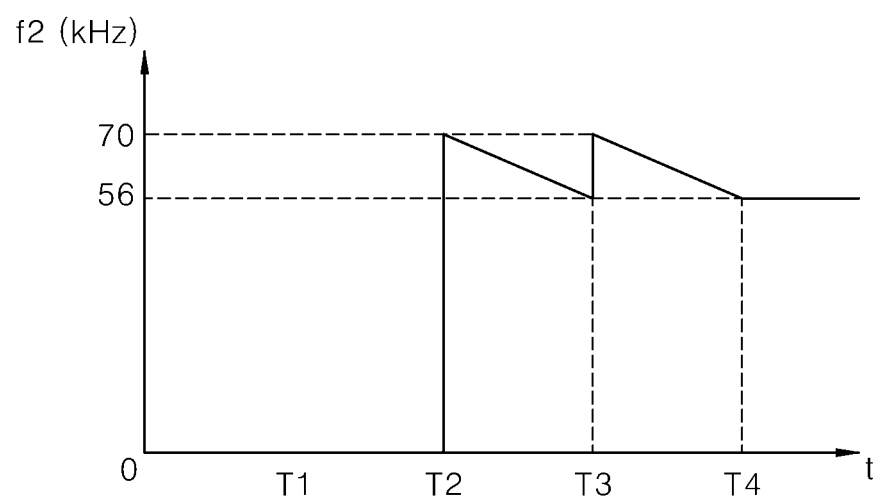

FIG. 4 is a graph illustrating a process of controlling drive frequencies of a first working coil and a second working coil when an induction heating device according to an embodiment is driven in a coupling mode. FIG. 5 is a graph illustrating a process of controlling drive frequencies of a first working coil and a second working coil when an induction heating device according to an embodiment is driven in a dividing mode. FIG. 6 is graph illustrating a process of controlling drive frequencies of a first working coil and a second working coil when an induction heating device according to an embodiment is driven in a normal mode.

Referring to FIG. 4, a user's drive command for the first working coil 103 may be input to the control unit 32 in a state where the second working coil 104 is not yet driven. The control unit 32 receiving the drive command for the first working coil 103 may drive the first working coil 103 at a preset or predetermined first adjustment frequency (for example, 70 kHz). For reference, a magnitude of the first adjustment frequency may be set differently depending on the embodiment. Accordingly, at a time point 0, the first working coil 103 may start to be driven at 70 kHz, which is the first adjustment frequency.

The control unit 32 may search for a target frequency of the first working coil 103 (first target frequency) by adjusting the drive frequency of the first working coil 103 such that the first working coil 103 can supply an output corresponding to thermal power set by the user with respect to the first working coil 103. For example, from a time point 0 to a time point T1 of FIG. 4, the control unit 32 may calculate an amount of power supplied by the first working coil 103 while gradually reducing the drive frequency of the first working coil 103 from the first adjustment frequency. The amount of power supplied by the first working coil 103 may be calculated based on an input voltage value transmitted from the voltage detection unit 212 and an input current value transmitted from the current detection unit 214.

The control unit 32 may determine a frequency value of the time point T1 (for example, 40 kHz) when the amount of power of the first working coil 103 measured while reducing the drive frequency corresponds to an output requested by the user via the drive command. Accordingly, the first working coil 103 may be driven at the first target frequency (40 kHz).

When the first working coil 103 is being driven at the first target frequency, the control unit 32 may receive a drive command for the second working coil 104. When the drive command for the second working coil 104 is received, the control unit 32 may stop driving of the first working coil 103 at a time point T2 so as to determine a target frequency of the second working coil 104 (second target frequency).

The control unit 32 may drive the second working coil 104 at the first adjustment frequency (70 kHz), simultaneously with stopping driving of the first working coil 103 at the time point T2. In some embodiments, the second working coil 104 may be driven at the first adjustment frequency after driving of the first working coil 103 is stopped and a preset or predetermined time has elapsed.

The control unit 32 may calculate an amount of power supplied by the second working coil 104 while gradually reducing the drive frequency of the second working coil 103 in the same manner as the above-described process of searching for the target frequency of the first working coil 103. When the amount of power supplied by the second working coil 104 corresponds to an output amount requested by the user, the control unit 32 may determine a frequency value of this time point T3 (43 kHz) as the second target frequency. In some embodiments, the control unit 32 may determine a second target frequency corresponding to the drive command of the second working coil 104 with reference to a table in which a target frequency corresponding to an output requested by a user with respect to the second working coil 104 is recorded.

As described above, when driving of the second working coil 104 is requested while the first working coil 103 is being driven, driving of the first working coil 103 may be temporarily stopped to search for a target frequency of the second working coil 104. Accordingly, the drive frequency of the first working coil 103 may become 0 during a period (T2 to T3) for searching for the target frequency of the second working coil 104. By this control, the drive frequency of the first working coil 103 may be maintained at 0 during the period (T2 to T3) of searching for the target frequency of the second working coil 104, thereby preventing interference noise between the first working coil 103 and the second working coil 104.

As described above, at a time point T3 when the second target frequency of the second working coil 104 is determined, the control unit 32 may compare the target frequencies of respective working coils with each other without immediately driving the first working coil 103 and the second working coil 104 at respective target frequencies. The control unit 32 may determine a drive mode of the induction heating device as one of modes for reducing interference noise (coupling mode and dividing mode) and a normal mode according to a comparison result.

More specifically, the control unit 32 may calculate a difference value M between the first target frequency of the first working coil 103 and the second target frequency of the second working coil 104. The control unit 32 may determine a drive mode by comparing the calculated difference value M with two preset or predetermined reference values, that is, a first reference value and a second reference value (here, the first reference value<the second reference value).

When the calculated difference value M is less than the first reference value, the control unit 32 may determine the drive mode of the induction heating device as the coupling mode. In the coupling mode, the control unit 32 may set the final drive frequency of the first working coil 103 and the final drive frequency of the second working coil 104 to be equal to each other.

For example, as in the embodiment of FIG. 4, when the first target frequency of the first working coil 103 is 40 kHz and the second target frequency of the second working coil 104 is determined to be 43 kHz at the time point T3, the control unit 32 may calculate a difference value between the two target frequencies (43−40=3). The control unit 32 may compare 3, which is the calculated difference value, with 5, which is a preset or predetermined first reference value. As the difference value is less than the first reference value as a result of comparison, the control unit 32 may determine the drive mode of the induction heating device as the coupling mode, and may set the final drive frequency of the first working coil 103 and the final drive frequency of the second working coil 104 to 40 kHz, which is a value to be equal to each other.

As described above, in embodiments, when the difference value between the first target frequency of the first working coil 103 and the second target frequency of the second working coil 104 is less than the first reference value, the final drive frequencies of the two working coils may be set to be equal to each other, thereby preventing interference noise caused by a difference between the drive frequencies of the two working coils.

As illustrated in FIG. 4, when the drive mode of the induction heating device is the coupling mode, the control unit 32 may set both the final drive frequencies of the first working coil 103 and the second working coil 104 to 40 kHz, which is the target frequency of the first working coil 103. However, in some embodiments, when the drive mode of the induction heating device is the coupling mode, the control unit 32 may set the final drive frequencies of the two working coils as the target frequency of the second working coil 104, or may set the final drive frequencies of the two working coils to have a value different from a value of the target frequency of the second working coil 104 (for example, an average value of the target frequencies of the two working coils or an arbitrarily set value).

When the calculated difference value M is equal to or greater than the first reference value and less than the second reference value, the control unit 32 may determine the drive mode of the induction heating device as the dividing mode. In the dividing mode, the control unit 32 may set a difference between the final drive frequency of the first working coil 103 and the final drive frequency of the second working coil 104 to correspond to a preset or predetermined noise avoidance setting value k.

For example, as in the embodiment of FIG. 5, when the first target frequency of the first working coil 103 is 40 kHz, and the second target frequency of the second working coil 104 is determined to be 50 kHz at the time point T3, the control unit 32 may calculate a difference value between the two target frequencies (50−40=10). The control unit 32 may compare 10, which is the calculated difference value, with 5, which is a preset or predetermined first reference value, and 15, which is a preset or predetermined second reference value. As the difference value is equal to or greater than the first reference value and less than the second reference value as a result of comparison, the control unit 32 may determine the drive mode of the induction heating device as the dividing mode.

Accordingly, the control unit 32 may set the final drive frequency of the first working coil 103 to 40 kHz which is equal to the first target frequency. The control unit 32 may set the final drive frequency of the second working coil 104 to 55 kHz such that the final drive frequency of the second working coil 104 is greater than 40 kHz, which the final drive frequency of the first working coil 103, by 15, which is the noise avoidance setting value k. The noise avoidance setting value k may vary depending on the embodiment, for example, it may be 20.

As described above, in embodiments, when a difference value between the first target frequency of the first working coil 103 and the second target frequency of the second working coil 104 is equal to or greater than the first reference value and less than the second reference value, the control unit 32 may set a difference between the final drive frequencies of the two working coils to correspond to the preset noise avoidance setting value k. By this setting, a difference between the drive frequencies of the two working coils may deviate from an audible frequency band (2 k to 15 kHz), and accordingly, interference noise caused by driving of the working coils may be reduced.

When the calculated difference value M is equal to or greater than the first reference value and less than the second reference value, the control unit 32 may determine the drive mode of the induction heating device as the dividing mode. In the dividing mode, the control unit 32 may set a difference between the final drive frequency of the first working coil 103 and the final drive frequency of the second working coil 104 to correspond to the preset noise avoidance setting value k.

For example, as in the embodiment of FIG. 5, when the first target frequency of the first working coil 103 is 40 kHz, and the second target frequency of the second working coil 104 is determined to be 50 kHz at the time point T3, the control unit 32 may calculate a difference value between the two target frequencies (50−40=10). The control unit 32 may compare 10, which is the calculated difference value, with 5, which is the preset first reference value, and 15, which is the preset second reference value. As the difference value is equal to or greater than the first reference value and less than the second reference value as a result of comparison, the control unit 32 may determine the drive mode of the induction heating device as the dividing mode.

Accordingly, the control unit 32 may set the final drive frequency of the first working coil 103 to 40 kHz which is equal to the first target frequency. The control unit 32 may set the final drive frequency of the second working coil 104 to 55 kHz such that the final drive frequency of the second working coil 104 is greater than 40 kHz, which the final drive frequency of the first working coil 103, by 15, which is the noise avoidance setting value k. The noise avoidance setting value k may vary depending on the embodiment, for example, it may be 20.

In some embodiments, the control unit 32 may set the final drive frequency of the first working coil 103 to have a value (for example, 32 kH) that is reduced from a value of the first target frequency (40 kHz), and the final drive frequency of the second working coil 104 to have a value (for example, 57 kHz) that is increased from a value of the second target frequency (50 kHz) such that a difference between the final drive frequency of the first working coil 103 and the final drive frequency of the second working coil 104 corresponds to 15, which is the preset noise avoidance setting value k.

In another embodiment, the control unit 32 may set the final drive frequency of the first working coil 103 to have a value (for example, 25 kHz) that is reduced from a value of the first target frequency (40 kHz), and the final drive frequency of the second working coil 104 to have a value that is equal to a value of the second target frequency (50 kHz). However, when a final drive frequency of a working coil is determined to have a value obtained by reducing a target frequency having a relatively low frequency value, an amount of power supplied from the working coil may be excessively large. Accordingly, the final drive frequency of the working coil may be determined to have a value obtained by increasing a target frequency having a relatively high frequency value.

When the calculated difference value M is equal to or greater than the second reference value, the control unit 32 may determine the drive mode of the induction heating device as the normal mode. The calculated difference value M that is greater than or equal to the second reference value means that a difference between the first target frequency of the first working coil 103 and the second target frequency of the second working coil 104 deviates from the audible frequency band (2 k to 15 kHz). Therefore, in this case, the control unit 32 may determine the first target frequency of the first working coil 103 as the final drive frequency of the first working coil 103, and the second target frequency of the second working coil 104 as the final drive frequency of the second working coil 104, without any change.

For example, as in the embodiment of FIG. 6, when the first target frequency of the first working coil 103 is 40 kHz, and the second target frequency of the second working coil 104 is determined to be 56 kHz at the time point T3, the control unit 32 may calculate a difference value between the two target frequencies (56−40=16). The control unit 32 may compare 16, which is the calculated difference value, with 15, the preset second reference value. As the difference value is equal to or greater than the second reference value, the control unit 32 may determine the drive mode of the induction heating device as the normal mode.

Accordingly, the control unit 32 may set the final drive frequency of the first working coil 103 to 40 kHz which is equal to the first target frequency. The control unit 32 may set the final drive frequency of the second working coil 104 to 56 kHz which is equal to the second target frequency of the second working coil 104.

When the final drive frequencies of the first working coil 103 and the second working coil 104 are determined after the second target frequency of the second working coil 104 is determined at the time point T3 via the above-described process, the control unit 32 may drive the first working coil 103 and the second working coil 104 simultaneously at a second adjustment frequency. For example, as illustrated in FIG. 6, at the time point T3, both the first working coil 103 and the second working coil 104 may be simultaneously driven at 70 kHz, which is the second adjustment frequency. As described above, in embodiments, after the second target frequency of the second working coil 104 is determined, the final drive frequencies of the first working coil 103 and the second working coil 104 may be determined. Accordingly, when the first working coil 103 and the second working coil 104 are driven, the first working coil 103 and the second working coil 104 may be simultaneously driven at the same frequency, as illustrated in FIG. 6.

In embodiments, a simultaneous drive operation of the first working coil 103 and the second working coil 104 is referred to as a "soft start" operation. For reference, the second adjustment frequency used for the soft start operation may be set to be equal to or different from the first adjustment frequency.

After the soft start operation is performed, the control unit 32 may adjust, that is, reduce, the drive frequencies of the first working coil 103 and the second working coil 104 to the preset final drive frequencies, respectively. When the adjustment of the drive frequencies is completed, the first working coil 103 and the second working coil 104 may be respectively driven at the preset final drive frequencies, and thereby a heating operation may be performed on a container without generating interference noise.

FIG. 7 is a flowchart illustrating a method for controlling an induction heating device according to an embodiment. FIG. 8 is a flowchart illustrating a method for obtaining final drive frequencies of a first working coil and a second working coil according to an embodiment.

Referring to FIG. 7, the control unit 32 of the induction heating device according to an embodiment may drive the first working coil 103 at the first target frequency (702). Next, the control unit 32 may receive a drive command for the second working coil 104 while the first working coil 103 is being driven at the first target frequency (704).

Next, the control unit 32 may stop driving of the first working coil 103 and drive the second working coil 104 at the first adjustment frequency so as to determine the second target frequency, which is the target frequency of the second working coil 104 (706). In the process of determining the target frequency of the second working coil 104, driving of the first working coil 103 may be completely stopped, thereby preventing interference noise that may occur due to a difference between the drive frequencies of the first working coil 103 and the second working coil 104.

Next, the control unit 32 may determine the second target frequency of the second working coil 104 corresponding to the drive command for the second working coil 104 (708). When the second target frequency is determined, the control unit 32 may determine the final drive frequency of the first working coil 103 and the final drive frequency of the second working coil 104 based on the first target frequency and the second target frequency (710).

For example, as illustrated in FIG. 8, the control unit 32 may calculate a difference value M between the first target frequency and the second target frequency (802). The control unit 32 may compare the calculated difference value with the preset first reference value and the preset second reference value, and may determine the drive mode of the induction heating device according to a comparison result. When the difference value M is less than the first reference value, the control unit 32 may determine the drive mode as the coupling mode (804), and may set the final drive frequency of the first working coil 103 and the final drive frequency of the second working coil 104 to be equal to each other (806). When the difference value M is equal to or greater than the first reference value and less than the second reference value, the control unit 32 may determine the drive mode as a dividing mode (808), and may set the final drive frequencies of respective working coils such that a difference between the final drive frequency of the first working coil 103 and the final drive frequency of the second working coil 104 corresponds to the preset noise avoidance setting value k (810). When the difference value M is equal to or greater than the second reference value, the control unit 32 may determine the drive mode as the normal mode (812), and may set the final drive frequency of the first working coil 103 and the final drive frequency of the second working coil 104 as the first target frequency and second target frequency, respectively (814).

Referring back to FIG. 7, the control unit 32 may drive the first working coil 103 and the second working coil 104 simultaneously at the second adjustment frequency (712). In the process of restarting driving of the first working coil 103, which has been stopped by the above-described soft start operation, interference noise that may occur due to a difference between the drive frequencies of the first working coil 103 and the second working coil 104 may be prevented.

The control unit 32 may adjust the drive frequency of the first working coil 103 and the drive frequency of the second working coil 104 to the preset final drive frequencies, respectively (714). When the drive frequencies are respectively adjusted to the final drive frequencies, the first working coil 103 and the second working coil 104 may be respectively driven at the final drive frequencies, and thereby a heating operation may be performed on a container without generating interference noise.

According to embodiments described, there is an advantage in that it is possible to reduce interference noise that may occur when two or more working coils provided in the induction heating device perform a heating operation. That is, it is possible to allow a difference value between the drive frequencies of the two working coils to deviate from the audible frequency band via a process of controlling the drive frequencies of respective working coils according to the above-described coupling mode or dividing mode, thereby preventing interference noise.

In addition, according to embodiments disclosed herein, there is an advantage in that it is possible to reduce interference noise that may occur in the process of driving a working coil at a predetermined target frequency after the target frequency of the working coil provided in the induction heating device is determined. For example, as described above, a soft start operation to simultaneously drive the first working coil and the second working coil may be performed after the target frequency of the second working coil and the final drive frequencies of respective working coils are determined. Such a soft start operation may prevent interference noise that may occur when the two working coils are driven simultaneously.

Embodiments disclosed herein provide an induction heating device capable of reducing interference noise that may occur when two or more working coils perform a heating operation, and a method for controlling an induction heating device. Embodiments disclosed herein also provide an induction heating device capable of reducing interference noise that may occur in the process of driving a working coil at a determined target frequency after the target frequency of the working coil is determined.

The technical aspects are not limited to the above-mentioned aspects, and the other aspects and the advantages which are not mentioned can be understood by the description, and more clearly understood by embodiments. It will be also readily seen that the aspects and the advantages may be realized by means indicated in the patent claims and a combination thereof.

According to an embodiment, a method for controlling an induction heating device is provided that may include receiving a drive command for a second working coil when a first working coil is being driven at a first target frequency, stopping driving of the first working coil, and driving the second working coil at a preset or predetermined first adjustment frequency, determining a second target frequency of the second working coil corresponding to the drive command for the second working coil, determining a final drive frequency of the first working coil and a final drive frequency of the second working coil based on the first target frequency and the second target frequency, respectively, driving the first working coil and the second working coil simultaneously at a second adjustment frequency, and adjusting a drive frequency of the first working coil and a drive frequency of the second working coil to the final drive frequency of the first working coil and the final drive frequency of the second working coil, respectively.

The determining the final drive frequency of the first working coil and the final drive frequency of the second working coil based on the first target frequency and the second target frequency may include calculating a difference value between the first target frequency and the second target frequency, and determining the final drive frequency of the first working coil and the final drive frequency of the second working coil according to a comparison result between the difference value and a preset or predetermined reference value.

When the difference value is less than a first reference value, the final drive frequency of the first working coil and the final drive frequency of the second working coil may be set to be equal to each other. When the difference value is less than the first reference value, the final drive frequency of the first working coil and the final drive frequency of the second working coil may be set as any one among the first target frequency and the second target frequency.

When the difference value is equal to or greater than the first reference value and less than the second reference value, a difference between the final drive frequency of the first working coil and the final drive frequency of the second working coil may be set to correspond to a preset or predetermined noise avoidance setting value. When the difference value is equal to or greater than the first reference value and less than the second reference value, a value obtained by increasing a larger value among the first target frequency and the second target frequency by the preset noise avoidance setting value and a smaller value among the first target frequency and the second target frequency may be set as the final drive frequency of the first working coil and the final drive frequency of the second working coil, respectively. When the difference value is equal to or greater than a second reference value, the final drive frequency of the first working coil may be set as the first target frequency, and the final drive frequency of the second working coil may be set as the second target frequency.

According to another embodiment, an induction heating device is provided that may include a first working coil disposed to correspond to a first heating area, a second working coil disposed to correspond to a second heating area, and a control unit configured to adjust drive frequencies of the first working coil and the second working coil according to a drive command input by a user. The control unit may receive a drive command for a second working coil when a first working coil is being driven at a first target frequency, stop driving of the first working coil and drive the second working coil at a preset or predetermined first adjustment frequency, determine a second target frequency of the second working coil corresponding to the drive command for the second working coil, determine a final drive frequency of the first working coil and a final drive frequency of the second working coil based on the first target frequency and the second target frequency, respectively, drive the first working coil and the second working coil simultaneously at a second adjustment frequency, and adjust a drive frequency of the first working coil and a drive frequency of the second working coil to the final drive frequency of the first working coil and the final drive frequency of the second working coil, respectively. The control unit may calculate a difference value between the first target frequency and the second target frequency, and determine the final drive frequency of the first working coil and the final drive frequency of the second working coil according to a comparison result between the difference value and a preset or predetermined reference value.

When the difference value is less than a first reference value, the final drive frequency of the first working coil and the final drive frequency of the second working coil may be set to be equal to each other. When the difference value is less than a first reference value, the final drive frequency of the first working coil and the final drive frequency of the second working coil may be set as any one among the first target frequency and the second target frequency.

When the difference value is equal to or greater than the first reference value and less than the second reference value, a difference between the final drive frequency of the first working coil and the final drive frequency of the second working coil may be set to correspond to a preset or predetermined noise avoidance setting value. When the difference value is equal to or greater than the first reference value and less than the second reference value, a value obtained by increasing a larger value among the first target frequency and the second target frequency by a preset or predetermined noise avoidance setting value, and a smaller value among the first target frequency and the second target frequency may be set as the final drive frequency of the first working coil and the final drive frequency, respectively. When the difference value is equal to or greater than a second reference value, the final drive frequency of the first working coil may be set as the first target frequency, and the final drive frequency of the second working coil may be set as the second target frequency.

According to embodiments, there is an advantage in that it is possible to reduce interference noise that may occur when two or more working coils provided in the induction heating device perform a heating operation. Further, according to embodiments, there is an advantage in that it is possible to reduce interference noise that may occur in the process of driving a working coil at a predetermined target frequency after the target frequency of the working coil is determined.

Since various substitutions, changes, and modifications can be made within the scope that does not deviate from the technical idea for those skilled in the art to which embodiments pertains, the embodiments are not limited by the above-mentioned embodiments and the accompanying drawings.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling an induction heating device, the method comprising:
   determining a first target frequency of a first working coil corresponding to the drive command for the first working coil;
   determining a second target frequency of a second working coil corresponding to the drive command for the second working coil; and
   determining a final drive frequency of the first working coil and a final drive frequency of the second working coil based on the first target frequency and the second target frequency, respectively, wherein the determining the final drive frequency of the first working coil and the final drive frequency of the second working coil based on the first target frequency and the second target frequency comprises:
   calculating a difference value between the first target frequency and the second target frequency; and
   determining the final drive frequency of the first working coil and the final drive frequency of the second working coil according to a comparison result between the difference value and a preset reference value.

2. The method according to claim 1, further comprises:
   receiving a drive command for the second working coil when the first working coil is being driven at the first target frequency; and
   stopping driving of the first working coil, and driving the second working coil at a predetermined first adjustment frequency.

3. The method according to claim 1, further comprises:
   driving the first working coil at the final drive frequency of the first working coil continuously and driving the second working coil at the final drive frequency of the second working coil continuously.

4. The method according to claim 1, wherein when the difference value is less than a first reference value, the final drive frequency of the first working coil and the final drive frequency of the second working coil are set to be equal to each other.

5. The method according to claim 1, wherein when the difference value is less than a first reference value, the final drive frequency of the first working coil and the final drive frequency of the second working coil are set as any one among the first target frequency and the second target frequency.

6. The method according to claim 1, wherein when the difference value is equal to or greater than a first reference value and less than a second reference value, a difference between the final drive frequency of the first working coil and the final drive frequency of the second working coil is set to correspond to a predetermined noise avoidance setting value.

7. The method according to claim 1, wherein when the difference value is equal to or greater than a first reference value and less than a second reference value, a value obtained by increasing a larger value among the first target frequency and the second target frequency by a predetermined noise avoidance setting value and a smaller value among the first target frequency and the second target frequency are set as the final drive frequency of the first working coil and the final drive frequency of the second working coil, respectively.

8. The method according to claim 1, wherein when the difference value is equal to or greater than a second reference value, the final drive frequency of the first working coil is set as the first target frequency, and the final drive frequency of the second working coil is set as the second target frequency.

9. The method according to claim 1, further comprising:
driving the first working coil and the second working coil simultaneously at a second adjustment frequency; and
adjusting a drive frequency of the first working coil and a drive frequency of the second working coil to the final drive frequency of the first working coil and the final drive frequency of the second working coil, respectively.

10. An induction heating device, comprising:
a first working coil disposed to correspond to a first heating area;
a second working coil disposed to correspond to a second heating area; and
a control unit configured to adjust drive frequencies of the first working coil and the second working coil according to a drive command input by a user, wherein the control unit is configured to:
determine a first target frequency of the first working coil corresponding to the drive command for the first working coil;
determine a second target frequency of the second working coil corresponding to the drive command for the second working coil; and
determine a final drive frequency of the first working coil and a final drive frequency of the second working coil based on the first target frequency and the second target frequency, respectively, wherein the control unit is configured to:
calculate a difference value between the first target frequency and the second target frequency; and
determine the final drive frequency of the first working coil and the final drive frequency of the second working coil according to a comparison result between the difference value and a preset reference value.

11. The induction heating device according to claim 10, wherein the control unit is further configured to:
receive a drive command for the second working coil when the first working coil is being driven at the first target frequency; and
stop driving of the first working coil, and drive the second working coil at a predetermined first adjustment frequency.

12. The induction heating device according to claim 10, wherein the control unit is configured to:
drive the first working coil at the final drive frequency of the first working coil continuously and drive the second working coil at the final drive frequency of the second working continuously.

13. The induction heating device according to claim 10, wherein when the difference value is less than a first reference value, the final drive frequency of the first working coil and the final drive frequency of the second working coil are set to be equal to each other.

14. The method according to claim 10, wherein when the difference value is less than a first reference value, the final drive frequency of the first working coil and the final drive frequency of the second working coil are set as any one among the first target frequency and the second target frequency.

15. The method according to claim 10, wherein when the difference value is equal to or greater than a first reference value and less than a second reference value, a difference between the final drive frequency of the first working coil and the final drive frequency of the second working coil is set to correspond to a predetermined noise avoidance setting value.

16. The method according to claim 10, wherein when the difference value is equal to or greater than the first reference value and less than the second reference value, a value obtained by increasing a larger value among the first target frequency and the second target frequency by a predetermined noise avoidance setting value and a smaller value among the first target frequency and the second target frequency are set as the final drive frequency of the first working coil and the final drive frequency of the second working coil, respectively.

17. The method according to claim 10, wherein when the difference value is equal to or greater than a second reference value, the final drive frequency of the first working coil is set as the first target frequency, and the final drive frequency of the second working coil is set as the second target frequency.

18. The method according to claim 10, wherein the control unit is further configured to:
drive the first working coil and the second working coil simultaneously at a second adjustment frequency; and
adjust a drive frequency of the first working coil and a drive frequency of the second working coil to the final drive frequency of the first working coil and the final drive frequency of the second working coil, respectively.

* * * * *